United States Patent
Yan et al.

(10) Patent No.: US 10,527,801 B2
(45) Date of Patent: *Jan. 7, 2020

(54) PLUG PROTECTION CAP, OPTICAL FIBER CONNECTOR ASSEMBLY, FIBER PLUG, AND NETWORK DEVICE

(71) Applicant: HUAWEI TECHNOLOGIES CO., LTD., Shenzhen, Guangdong (CN)

(72) Inventors: Xiongwei Yan, Shenzhen (CN); Wenxin Wu, Shenzhen (CN); Yuliang Wang, Shenzhen (CN); Xuesong Huang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,081

(22) Filed: Feb. 11, 2019

(65) Prior Publication Data

US 2019/0170947 A1 Jun. 6, 2019

Related U.S. Application Data

(63) Continuation of application No. 15/817,085, filed on Nov. 17, 2017, now Pat. No. 10,215,929, which is a (Continued)

(30) Foreign Application Priority Data

May 20, 2015 (CN) .......................... 2015 1 0260208

(51) Int. Cl.
*G02B 6/38* (2006.01)
*G02B 6/44* (2006.01)

(52) U.S. Cl.
CPC ........... *G02B 6/387* (2013.01); *G02B 6/3849* (2013.01); *G02B 6/4465* (2013.01)

(58) Field of Classification Search
CPC .... G02B 6/387; G02B 6/3846; G02B 6/3849; G02B 6/3851; G02B 6/3874
(Continued)

(56) References Cited

U.S. PATENT DOCUMENTS 5,809,192 A 9/1998 Manning et al.
5,845,029 A 12/1998 Matsuoka et al.
(Continued)

FOREIGN PATENT DOCUMENTS

CN 1333471 A 1/2002
CN 1629668 A 6/2005
(Continued)

OTHER PUBLICATIONS

Chinese Office Action issued in Chinese Application No. 201510260208.1 dated Sep. 28, 2017, 8 pages.
(Continued)

*Primary Examiner* — Robert Tavlykaev
(74) *Attorney, Agent, or Firm* — Fish & Richardson P.C.

(57) ABSTRACT

The present disclosure discloses a plug protection cap that includes a main body, a connecting sleeve, and a traction stub. An accommodating cavity is disposed in the main body. An inlet is through the accommodating cavity that is disposed on an end face of one end of the main body. One end of the connecting sleeve detachably sheathes one end that is of the main body and that is away from the inlet, and the other end of the connecting sleeve is connected to one end of the traction stub in a rotatable manner. The present disclosure further discloses an optical fiber connector assembly, a fiber plug, and a network device.

12 Claims, 4 Drawing Sheets

Related U.S. Application Data continuation of application No. PCT/CN2015/091576, filed on Oct. 9, 2015.

(58) Field of Classification Search
USPC .................................. 385/76–78, 81, 84, 39
See application file for complete search history.

(56) References Cited

U.S. PATENT DOCUMENTS

| | | | |
|---|---|---|---|
| 6,190,616 | B1 | 2/2001 | Jovanovich et al. |
| 6,398,422 | B1 | 6/2002 | Szilagyi et al. |
| 7,220,062 | B2 * | 5/2007 | Durrant ............... G02B 6/4246 385/88 |
| 7,621,675 | B1 | 11/2009 | Bradley |
| 8,038,356 | B2 | 10/2011 | Marcouiller et al. |
| 8,132,970 | B2 * | 3/2012 | Hsu .................... G02B 6/3833 385/69 |
| 8,403,570 | B2 | 3/2013 | Fisher et al. |
| 9,268,102 | B2 | 2/2016 | Daems et al. |
| 9,684,138 | B2 | 6/2017 | Lu et al. |
| 9,829,646 | B2 * | 11/2017 | Watte .................. G02B 6/3823 |
| 2001/0007641 | A1 | 7/2001 | Jovanovich et al. |
| 2001/0019654 | A1 | 9/2001 | Waldron et al. |
| 2005/0196106 | A1 | 9/2005 | Taira et al. |
| 2006/0045428 | A1 | 3/2006 | Theuerkorn et al. |
| 2006/0045430 | A1 | 3/2006 | Theuerkorn et al. |
| 2006/0193562 | A1 | 8/2006 | Theuerkorn |
| 2007/0031103 | A1 | 2/2007 | Tinucci et al. |
| 2007/0160327 | A1 | 7/2007 | Lewallen et al. |
| 2007/0253666 | A1 | 11/2007 | Lu |
| 2010/0092137 | A1 | 4/2010 | Niiyama et al. |
| 2011/0305424 | A1 | 12/2011 | Pierce et al. |
| 2013/0109243 | A1 | 5/2013 | Toda et al. |
| 2014/0086534 | A1 | 3/2014 | Lu et al. |

FOREIGN PATENT DOCUMENTS

| | | |
|---|---|---|
| CN | 101006376 A | 7/2007 |
| CN | 100550548 C | 10/2009 |
| CN | 101861540 A | 10/2010 |
| CN | 101641627 B | 5/2012 |
| CN | 102565956 A | 7/2012 |
| CN | 102798941 A | 11/2012 |
| CN | 103091792 A | 5/2013 |
| CN | 203688855 U | 7/2014 |
| CN | 203825235 U | 9/2014 |
| CN | 203895869 U | 10/2014 |
| JP | S63271402 A | 11/1988 |
| JP | H10509523 A | 9/1998 |
| JP | 2001516048 A | 9/2001 |
| JP | 2008501145 A | 1/2008 |
| JP | 2008233559 A | 10/2008 |
| JP | 2010191420 A | 9/2010 |
| KR | 20010012801 A | 2/2001 |
| WO | 2009040567 A1 | 4/2009 |
| WO | 2016019993 A1 | 2/2016 |

OTHER PUBLICATIONS

Chinese Office Action issued in Chinese Application No. 201510260208.1 dated May 31, 2018, 8 pages.
Extended European Search Report issued in European Application No. 15892392.0 dated May 23, 2018, 8 pages.
Japanese Notice of Reasons for Rejection (Office Action) issued in Japanese Application No. 2017-559567 dated Oct. 30, 2018, 9 pages.
Korean Office Action issued in Korean Application No. 10-2017-7035664 dated Aug. 28, 2018, 12 pages.
International Search Report and Written Opinion issued in International Application No. PCT/CN2015/091576 dated Feb. 26, 2016, 22 pages.

* cited by examiner

PLUG PROTECTION CAP, OPTICAL FIBER CONNECTOR ASSEMBLY, FIBER PLUG, AND NETWORK DEVICE

CROSS-REFERENCE TO RELATED APPLICATIONS

This application is a continuation of U.S. patent application Ser. No. 15/817,085, filed on Nov. 17, 2017, which is a continuation of International Application No. PCT/CN2015/091576, filed on Oct. 9, 2015. The International Application claims priority to Chinese Patent Application No. 201510260208.1, filed on May 20, 2015. All of the aforementioned patent applications are hereby incorporated by reference in their entireties.

TECHNICAL FIELD

The present disclosure relates to a plug protection cap, an optical fiber connector assembly, a fiber plug, and a network device.

BACKGROUND

With rapid development of optical communication around the world, application of the optical communication keeps extending from a backbone network to a non-backbone network and an access network. In a fiber optic communications link, to meet requirements for flexible connection between different modules, devices, and systems, a connecting component is required for performing detachable connection between fibers. In this way, an optical path can perform transmission along a required path, so as to implement and complete predetermined or expected objectives and requirements. Therefore, as an indispensable connecting part in the optical communication, an optical fiber assembly is widely used.

In the prior art, a common connection manner that is used to connect an optical fiber connector at a drop side of a fiber to an outdoor fiber is onsite splicing. However, the connection manner is of a low protection level and is unfavorable to outdoor routing of fibers. To suit outdoor routing, a connection manner commonly used in the prior art is premaking an optical fiber assembly. Parts such as a plug core assembly, a spring, and a spring base are assembled into a fiber assembly whose outline dimension is smaller than that of an assembly housing, so that the fiber assembly can pass through an elongated pipeline, and after passing through the elongated pipeline, the fiber assembly can be quickly assembled into the assembly housing on site. However, in this connection manner, when passing through the pipeline, the fiber assembly is not strong enough to resist torsion and is vulnerable to damage. In addition, the fiber assembly is not well protected in a process of passing through the pipeline, and there is only a dustproof cap at the head of the plug core and no other protection is provided; therefore, the fiber assembly is not suitable for an outdoor extreme pipeline environment such as silt and water immersion.

SUMMARY

The present disclosure aims to provide a plug protection cap that is torsion-resistant and is used to protect a fiber connector and prevent the fiber connector from contamination and damage in a process of passing through a pipeline to a home.

The present disclosure further provides a fiber plug and a network device.

According to a first aspect, the present disclosure provides a plug protection cap, where the protection cap includes a main body, a connecting sleeve, and a traction stub, an accommodating cavity is disposed in the main body, an inlet that is through to the accommodating cavity is disposed on an end face of one end of the main body, a locking part is disposed at a position that is on an inner circumferential surface of the accommodating cavity and that is near the inlet, one end of the connecting sleeve detachably sheathes one end that is of the main body and that is away from the inlet, and the other end of the connecting sleeve is rotatably connected to one end of the traction stub.

In a first possible implementation manner, openings are disposed at two opposite ends of the connecting sleeve, and a first inner thread is disposed on an inner circumferential surface of one of the openings; the end that is of the main body and that is away from the inlet is a connecting section, and a first outer thread connected to the first inner thread is disposed on an outer circumferential surface of the end that is of the main body and that is away from the inlet.

With reference to the first possible implementation manner, in a second possible implementation manner, a first flange is disposed on an outer circumferential surface of the one end of the traction stub, a second flange is disposed on an inner circumferential surface of the other opening that is of the connecting sleeve and that is away from the first inner thread, the first flange is clamped onto the second flange, and the first flange can rotate relative to the second flange.

With reference to the second possible implementation manner, in a third possible implementation manner, the traction stub is a column, one end that is of the traction stub and that is away from the first flange is a pointed part, and a groove is disposed inside the end at which the first flange is disposed.

With reference to the first aspect or the first to third possible implementation manners of the first aspect, in a fourth possible implementation manner, the locking part is one of an inner thread, a hook, a slot, and an elastic bulge.

With reference to the first aspect or the first to third possible implementation manners of the first aspect, in a fifth possible implementation manner, the main body is a hollow column that is open at one end and closed at the other end and that is designed to have a terraced pattern, and a dimension of an outer circumference of the end at which the inlet is disposed is greater than a dimension of an outer circumference of the end that is of the main body and that is away from the inlet.

With reference to the first aspect or the first to third possible implementation manners of the first aspect, in a sixth possible implementation manner, a throughhole is further disposed on the traction stub.

According to a second aspect, the present disclosure provides an optical fiber connector assembly, where the optical fiber connector assembly includes a connector and the plug protection cap according to the first aspect and any one possible implementation manner of the first aspect, and the connector includes a plug core, a plug core holder, a limiting sleeve, a spring, a rear retainer, and a sealing ring;

the limiting sleeve includes an accommodating cavity, a first jack, a second jack opposite to the first jack, and at least one limiting elastic plate, both the first jack and the second jack are through to the accommodating cavity, the at least one limiting elastic plate is disposed at an edge of the second jack and extends in a direction parallel to an axis of the limiting sleeve, and the sealing ring sheathes one end, at which the second jack is disposed, of the limiting sleeve;

one end of the limiting sleeve is connected to the plug core holder in a plug-in manner, the spring and the rear retainer sheathe the plug core, and the plug core passes through the plug core holder and the accommodating cavity and protrudes out of the second jack; the spring and a portion of the rear retainer are located in the accommodating cavity, and the spring connects the rear retainer and the accommodating cavity; and the at least one limiting elastic plate is clamped onto the rear retainer; and the plug protection cap sheathes the end, at which the second jack is disposed, of the limiting sleeve, and is locked to the limiting sleeve by the locking part, the accommodating cavity accommodates a portion that is of the plug core and that protrudes out of the second jack, and the sealing ring is used to seal the limiting sleeve and the plug protection cap.

In a first possible implementation manner of the second aspect, a fitting part corresponding to the locking part is disposed on an outer circumferential surface of the end, at which the second jack is disposed, of the limiting sleeve, and the fitting part is one of an outer thread, a slot, a hook, and a groove.

With reference to the second aspect or the first possible implementation manner of the second aspect, in a second possible implementation manner, an abut flange is disposed on an inner circumferential surface of the accommodating cavity, a boss is disposed on an outer circumferential surface of one end of the rear retainer, and two end parts of the spring separately abut against the boss and the abut flange.

With reference to the second possible implementation manner of the second aspect, in a third possible implementation manner, the plug core includes a connecting body and a head located at one end of the connecting body, the rear retainer sheathes the plug core, and the end, at which the boss is disposed, of the rear retainer is located at a joint between the head and the connecting body.

With reference to the second possible implementation manner of the second aspect, in a fourth possible implementation manner, there are two limiting elastic plates, a hook is disposed at a free end of the limiting elastic plate, and a clamping bulge or a slot adaptable to the hook is disposed on the boss of the rear retainer.

With reference to the second aspect or the first to fourth possible implementation manners of the second aspect, in a fifth possible implementation manner, the plug core holder includes an outer sealing sleeve and an inner crimping ring, the inner crimping ring is disposed by clinging to an inner circumferential surface of the outer sealing sleeve, and an axial length of the inner crimping ring is less than an axial length of the outer sealing sleeve.

According to a third aspect, the present disclosure provides a fiber plug, where the fiber plug includes a connector and a connector housing, an opening part is disposed at one end of the connector housing, and the connector includes a plug core, a plug core holder, a limiting sleeve, a spring, a rear retainer, and a sealing ring;

the limiting sleeve includes an accommodating cavity, a first jack, a second jack opposite to the first jack, and at least one limiting elastic plate, the first jack and the second jack are through to the accommodating cavity, the at least one limiting elastic plate is disposed at an edge of the second jack and extends in a direction parallel to an axis of the limiting sleeve, and the sealing ring sheathes one end, at which the second jack is disposed, of the limiting sleeve;

one end, at which the first jack is disposed, of the limiting sleeve is connected to the plug core holder in a plug-in manner, the spring and the rear retainer sheathe the plug core, and the plug core passes through the plug core holder and the accommodating cavity and protrudes out of the second jack; the spring and a portion of the rear retainer are located in the accommodating cavity, and the spring connects the rear retainer and the accommodating cavity; and the at least one limiting elastic plate is clamped onto the rear retainer; and the end, at which the second jack is disposed, of the limiting sleeve is plugged into the connector housing through the opening part.

In a first possible implementation manner of the third aspect, a cavity is formed inside the connector housing, one end of the connector housing is the opening part and the other end is a through hole, both the opening part and the through hole are through to the cavity, a groove is disposed on an inner circumferential surface of the cavity, and the groove is used to accommodate the sealing ring that sheathes the limiting sleeve.

With reference to the third aspect or the first possible implementation manner of the third aspect, in a second possible implementation manner, a protection part is disposed at the end, at which the through hole is disposed, of the connector housing.

With reference to the third aspect or the first or second possible implementation manner of the third aspect, in a third possible implementation manner, an abut flange is disposed on an inner circumferential surface of the accommodating cavity, a boss is disposed on an outer circumferential surface of one end of the rear retainer in a protruding manner, and two end parts of the spring separately abut against the boss and the abut flange.

With reference to the third possible implementation manner of the third aspect, in a fourth possible implementation manner, the plug core includes a connecting body and a head located at one end of the connecting body, the rear retainer sheathes the plug core, and the end, at which the boss is disposed, of the rear retainer is located at a joint between the head and the connecting body.

With reference to the third or fourth possible implementation manner of the third aspect, in a fifth possible implementation manner, there are two limiting elastic plates, a hook is disposed at a free end of the limiting elastic plate, and a clamping bulge or a slot adaptable to the hook is disposed on the boss of the rear retainer.

With reference to the third aspect or the first to fourth possible implementation manners of the third aspect, in a sixth possible implementation manner, the plug core holder includes an outer sealing sleeve and an inner crimping ring, the inner crimping ring is disposed by clinging to an inner circumferential surface of the outer sealing sleeve, and an axial length of the inner crimping ring is less than an axial length of the outer sealing sleeve.

With reference to the third aspect or the first to fourth possible implementation manners of the third aspect, in a seventh possible implementation manner, a fitting part is disposed on an inner circumferential surface of the accommodating cavity of the limiting sleeve, the fitting part is one of an outer thread, a slot, a hook, and a groove, and the fitting part may fit in with the cavity of the connector housing.

According to a fourth aspect, the present disclosure provides a network device, including the fiber plug according to any one of the foregoing possible implementation manners and an adapter with a fiber jack, where a plug core of the fiber plug is connected to the fiber jack of the adapter in a plug-in manner.

The plug protection cap in the present disclosure covers a connector at an end of a fiber when the fiber is pulled. In a pulling process, fast pulling and protection for the connector are implemented by using the plug protection cap, the connector is prevented from external contamination, and a high IP protection level is provided for the connector. In addition, a traction stub of the plug protection cap can be disposed rotatably, which is suitable for outdoor direct routing of fibers and a scenario in which the fiber plug passes through a pipeline to a home. It is extremely convenient to unscrew the plug protection cap on site after routing of the fibers is completed, and operations are simple and fast.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The present disclosure provides an optical fiber connector assembly and a fiber plug. The optical fiber connector assembly includes a connector and a plug protection cap. The plug protection cap is used to pull the connector to pass through a pipeline when a fiber is laid in a home from an outside of the home, and protect a plug core of the connector. The fiber plug is used for connection between a fiber and a network device in a network system. The fiber plug includes the connector and a connector housing, and the connector housing covers the connector and forms a standard fiber plug together with the connector.

Figure 1:
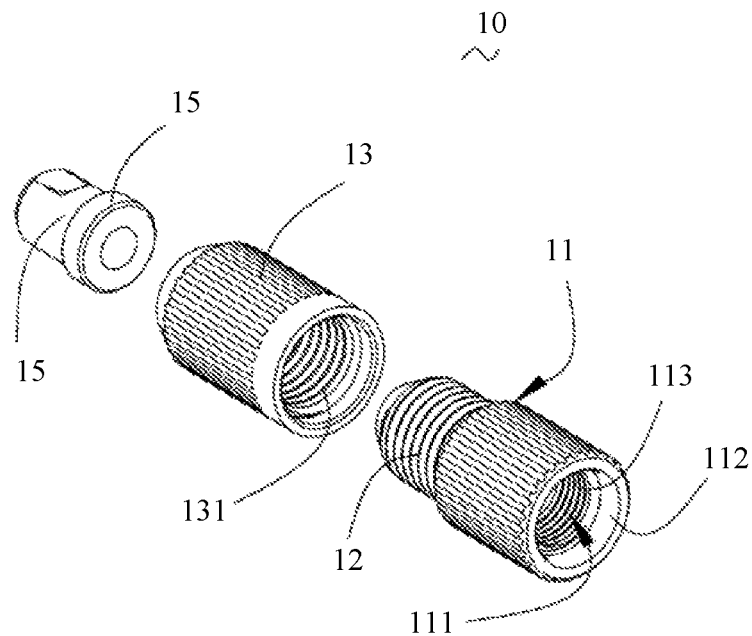
FIG. 1 is a schematic exploded diagram of a structure of a plug protection cap according to an embodiment of the present disclosure.

FIG. 1 shows a structure of a plug protection cap of a fiber connector. As shown in FIG. 1, a plug protection cap 10 in the present disclosure includes a main body 11, a connecting sleeve 13, and a traction stub 15. An accommodating cavity 111 is disposed in the main body 11. An inlet 112 that is through to the accommodating cavity 111 is disposed on an end face of one end of the main body 11. A locking part 113 is disposed on an inner circumferential surface that is of the accommodating cavity 111 and that is near the inlet 112. One end of the connecting sleeve 13 detachably sheathes one end that is of the main body 11 and that is away from the inlet 112, and the other end of the connecting sleeve 13 is rotatably connected to one end of the traction stub 15.

Further, the main body 11 is a hollow column that is open at one end and closed at the other end and that is designed to have a terraced pattern, and a dimension of an outer circumference of the end at which the inlet is disposed is greater than a dimension of an outer circumference of the end that is of the main body 11 and that is away from the inlet. Specifically, the plug protection cap 10 is made of a plastic material. The main body 11 is a terraced cylinder, and includes a body section 114 and a connecting section 12 that extends from the body section 114. A cross section of the accommodating cavity 111 is terraced, and a diameter of a portion that is of the cross section and that is near the inlet 112 is greater than a diameter a portion that is of the cross section and that is located in the connecting section 12. The inlet 112 is disposed on an end face that is of the body section and that is away from the connecting section 12. A dimension of an outer circumference of the body section 114 is greater than a dimension of an outer circumference of the connecting section 12, and it is convenient for the connecting sleeve 13 to form, after sheathing the connecting section 12, a complete and smooth cylindrical outer circumferential surface together with an outer circumferential surface of the connecting sleeve 13 and an outer circumferential surface of the body section 114. Preferably, a circumferential diameter of the complete and smooth cylindrical outer circumferential surface is less than or equal to 8 millimeters, and the complete and smooth cylindrical outer circumferential surface can pass through most pipelines of standard dimensions, which further helps the plug protection cap 10 in passing through a pipeline.

Figure 2:
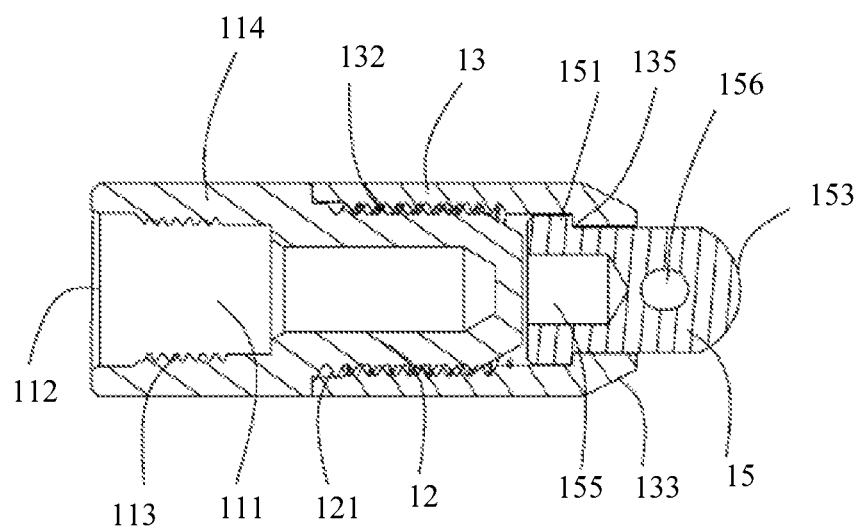
FIG. 2 is a schematic sectional diagram of a plug protection cap obtained after the plug protection cap shown in FIG. 1 is assembled.

Also referring to FIG. 2, further, openings 131 are disposed at both ends of the connecting sleeve 13, and a first inner thread 132 is disposed on an inner circumferential surface of one of the openings 131; and a first outer thread 121 connected to the first inner thread 132 is disposed on an outer circumferential surface of the other end that is of the main body 11 and that is away from the inlet 112. Specifically, the first outer thread 121 is disposed on an outer circumferential surface of the connecting section 12. The connecting sleeve 13 is a hollow cylinder. A sloping surface 133 is disposed on an outer circumferential surface of one end that is of the connecting sleeve and that is away from the first inner thread 132. The sloping surface 133 helps to successfully plug the plug protection cap 10 into a pipeline when the plug protection cap 10 is to pass through the pipeline.

Further, a first flange 151 is disposed on an outer circumferential surface of the one end of the traction stub 15, a second flange 135 is disposed on an inner circumferential surface of the other opening 131 that is of the connecting sleeve 13 and that is away from the first inner thread 132, and the first flange 151 is clamped onto the second flange 135 and rotates with respect to the second flange 135. Still further, the traction stub 15 is a column, one end that is of the traction stub 15 and that is away from the first flange 151 is a pointed part 153, and a groove 155 is disposed inside an end part in which the first flange 151 is disposed. A through hole 156 is disposed on the pointed part 153 of the traction stub 15.

Specifically, the traction stub 15 is roughly a rubber cylinder, the first flange 151 is disposed around an edge of one end of the traction stub 15, and the groove 155 is disposed on an end face of this end and may provide space for distortion of an end part, in which the first flange 151 is disposed, of the traction stub 15, so that the first flange 151 enters the connecting sleeve 13 from the opening 131 of the connecting sleeve 13 first. The pointed part 153 is an arc surface, so as to help successfully plug the plug protection cap 10 into a pipeline when the plug protection cap 10 is to pass through the pipeline. The through hole 156 is a through hole that penetrates the traction stub 15, and is used to fasten a traction sling or a traction rod, so as to pull the plug protection cap 10 to move when the plug protection cap 10 is to pass through the pipeline.

The second flange 135 is disposed around an inner circumferential surface of the opening 131 of the connecting sleeve 13. Preferably, the traction stub 15 may be installed into the connecting sleeve 13 from the end, at which the first inner thread 132 is disposed, of the connecting sleeve 13, and the first flange 151 and the second flange 135 are clamped to each other and rotate relative to each other; therefore, the traction stub 15 can rotate relative to the connecting sleeve 13 and the main body 11. In a process in which the plug protection cap 10 passes through the pipeline, the plug protection cap 10 generates specific torsion when receiving external resistance such as a tractive force. The traction stub 15 used as the most front end can rotate alone to cancel the torsion and prevent the connecting sleeve 13 from detaching from the main body 11 under the external torsion.

Further, the locking part 113 is one of an inner thread, a hook, a slot, and an elastic bulge. Preferably, the locking part is an inner thread. The locking part is used to lock the plug protection cap onto the connector.

Figure 3:
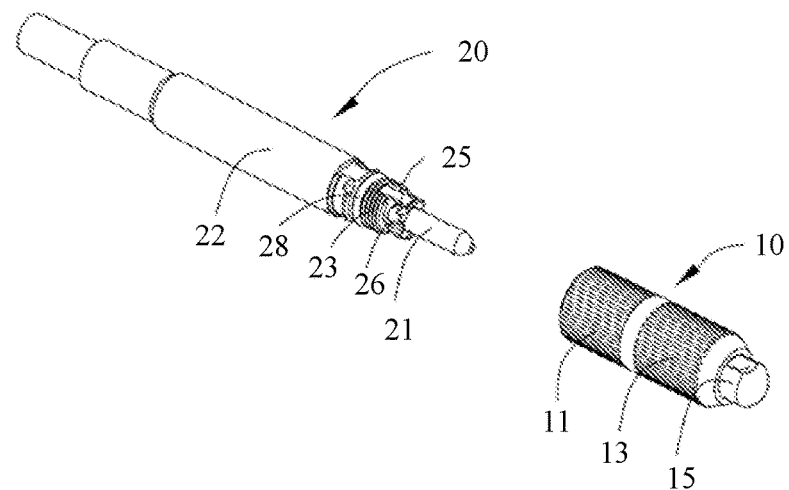
FIG. 3 is a schematic exploded diagram of an optical fiber connector assembly according to the present disclosure.
Figure 4:
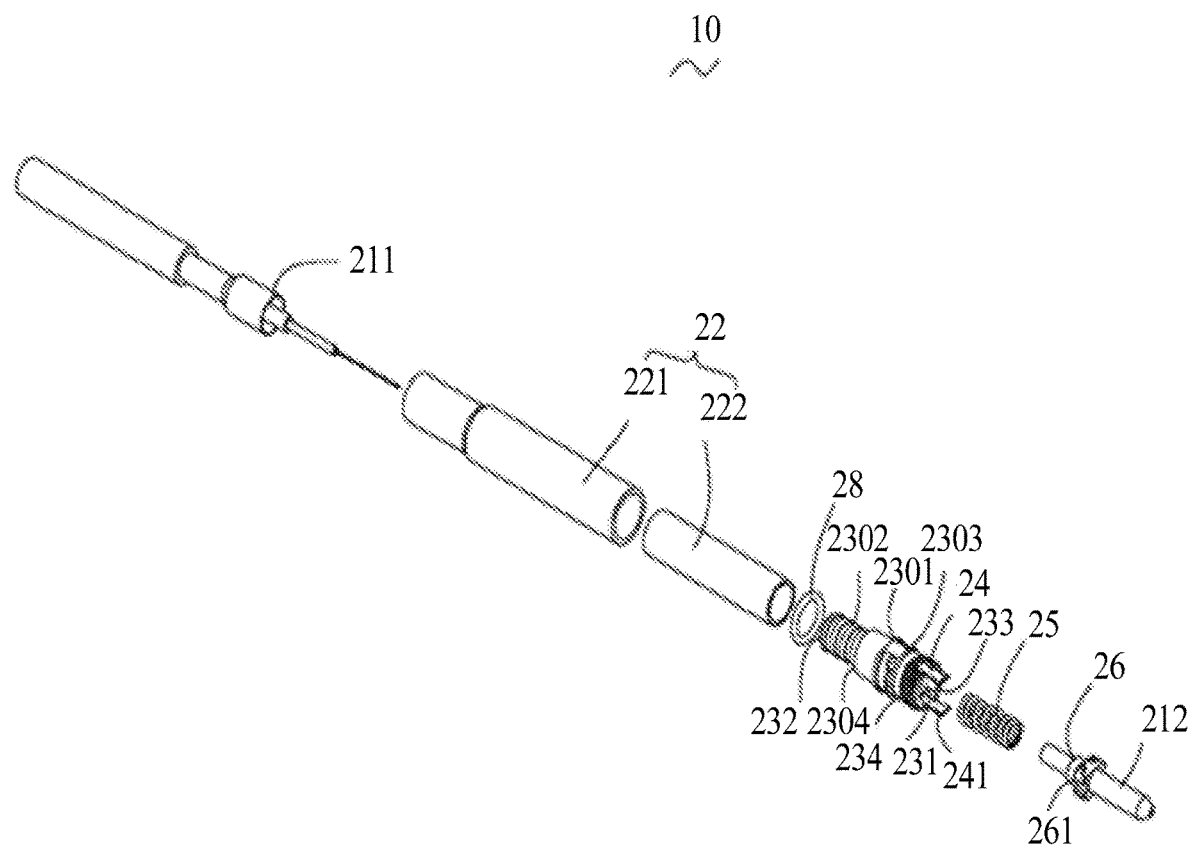
FIG. 4 is a schematic exploded diagram of a connector of the optical fiber connector assembly shown in FIG. 3.

Referring to FIG. 3 and FIG. 4, an optical fiber connector assembly in the present disclosure includes a connector 20 and the plug protection cap 10. The connector 20 includes a plug core 21, a plug core holder 22, a limiting sleeve 23, a spring 25, a rear retainer 26, and a sealing ring 28. The limiting sleeve 23 includes an accommodating cavity 231, a first jack 232, a second jack 233 opposite to the first jack 232, and at least one limiting elastic plate 24. Both the first jack 232 and the second jack 233 are through to the accommodating cavity 231, the at least one limiting elastic plate 24 is disposed at an edge of the second jack 233 and extends in a direction parallel to an axis of the limiting sleeve 23, and the sealing ring 28 sheathes one end, at which the second jack 233 is disposed, of the limiting sleeve 23.

One end, at which the first jack 232 is disposed, of the limiting sleeve 23 is connected to the plug core holder 22 in a plug-in manner, the spring 25 and the rear retainer 26 sheathe the plug core 21, and the plug core 21 passes through the plug core holder 22 and the accommodating cavity 231 and protrudes out of the second jack 233; the spring 25 and a portion of the rear retainer 26 are located in the accommodating cavity 231, and the spring 25 connects the rear retainer 26 and the accommodating cavity 231; and the at least one limiting elastic plate 24 is clamped onto the rear retainer 26.

The plug protection cap 10 sheathes the end, at which the second jack 233 is disposed, of the limiting sleeve 23, and is locked to the limiting sleeve 23 by the locking part 113. The accommodating cavity 111 accommodates a portion that is of the plug core 21 and that protrudes out of the second jack 233. The sealing ring 28 seals the limiting sleeve 23 and the plug protection cap 10. The sealing ring 28 is used to implement sealing between the connector 20 and the plug protection cap 10 and prevent contamination of the connector 20 from the outside.

In the present disclosure, when a fiber is pulled, a connector 20 is disposed in an end part of the fiber. In a pulling process, fast pulling and protection for the connector 20 are implemented by using a plug protection cap 10, the connector 20 is protected against external contamination, and a high IP protection level is provided for the connector 20. In addition, the plug protection cap 10 has relatively high torsion-resistance strength and is suitable for outdoor direct routing of fibers and a scenario in which a fiber plug passes through a pipeline to a home. It is extremely convenient to unscrew the plug protection cap 10 on site after routing of the fibers is completed, and operations are simple and fast.

Figure 5:
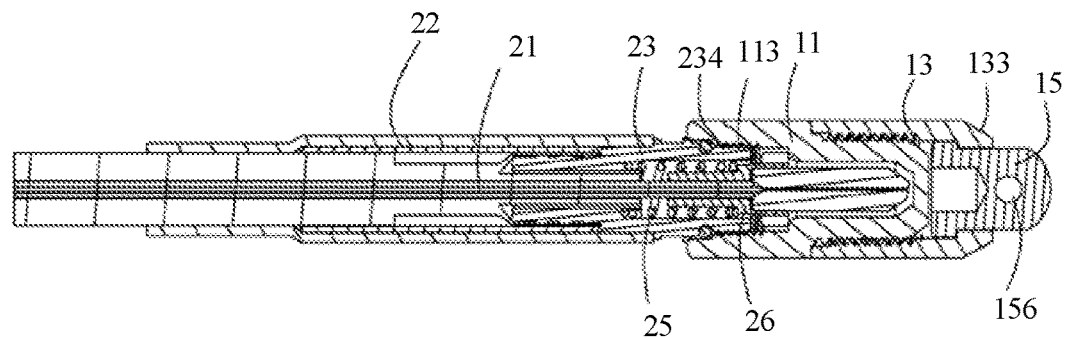
FIG. 5 is a schematic sectional diagram of an optical fiber connector assembly obtained after the optical fiber connector assembly shown in FIG. 3 is assembled.

Also referring to FIG. 5, further, a fitting part 234 corresponding to the locking part 113 is disposed on an outer circumferential surface of the end, at which the second jack 233 is disposed, of the limiting sleeve 23, and the fitting part 234 is one of an outer thread, a slot, a hook, and a groove. Preferably, the fitting part 234 is an outer thread, and is connected, by using a thread, to the locking part 113 whose shape is an inner thread.

Specifically, the limiting sleeve 23 is a terraced hollow cylinder, and a contour of the accommodating cavity 231 is the same as a contour of an outer circumferential surface of the limiting sleeve 23. A first step 2301 is disposed on the outer circumferential surface of the limiting sleeve 23, and the first step 2301 divides the limiting sleeve 23 into a first section 2302 and a second section 2303. Preferably, a diameter of the second section 2303 is greater than a diameter of the first section 2302. A second step 2304 is disposed on an outer circumferential surface of the first section 2302. The first jack 232 is disposed on an end face of the first section 2301. The second jack 233 is disposed on an end face of the second section 2303. The first section 2302 is plugged into the plug core holder 22, and the fitting part 234 formed by outer threads is disposed on an outer circumferential surface of the second section 2303. The second section 2303 is plugged into the accommodating cavity 111 of the plug protection cap 10.

Further, the plug core holder 22 includes an outer sealing sleeve 221 and an inner crimping ring 222, the inner crimping ring 222 is disposed by clinging to an inner circumferential surface of the outer sealing sleeve 221, and an axial length of the inner crimping ring 222 is less than an axial length of the outer sealing sleeve 221. The outer sealing sleeve 221 and the inner crimping ring 222 are cylindrical and are disposed coaxially. Both the inner crimping ring 222 and the outer sealing sleeve 221 sheathe the first section 2302 of the limiting sleeve 23, an end part of the outer sealing sleeve 221 abuts against the first step 2301, and an end part of the inner crimping ring 222 abuts against the second step 2303.

Further, an abut flange 2311 is disposed on an inner circumferential surface of the accommodating cavity 231, a boss 261 is disposed on an outer circumferential surface of one end of the rear retainer 26 in a protruding manner, and two end parts of the spring 25 separately abut against the boss 261 and the abut flange 2311. Still further, there are two limiting elastic plates 24, a hook 241 is disposed at a free end of the limiting elastic plate 24, and a clamping bulge or a slot corresponding to the hook 241 is disposed on the boss 261 of the rear retainer 26. Preferably, a slot corresponding to the hook 241 is disposed on the rear retainer 26, and the slot is clamped onto the hook 241. Specifically, the spring 25 is a coil spring. The two limiting elastic plates 24 are disposed opposite to each other at an edge of the second jack 233 on the second section 2303. The rear retainer 26 is a cylinder whose cross section is T-shaped, and the hook 241 is disposed at a relatively wide end part of each limiting elastic plate 24. The limiting elastic plate 24 may limit movement of the plug core 21 in a direction vertical to an axial direction. When the spring 25 stretches, and the limiting elastic plate 24 limits movement of the rear retainer along the plug core 21, thereby avoiding impact on assembling of the plug core.

In this embodiment, the sealing ring 28 is a rubber ring whose cross section is circle-shaped. Preferably, to install the sealing ring 28 onto the limiting elastic plate 24 more firmly, a first groove is disposed at a position at which the outer circumferential surface of the second section 2303 adjoins the outer thread, and the sealing ring is clamped inside the first groove and protrudes out of the first groove.

Further, the plug core 21 includes a connecting body 211 and a head 212 located at one end of the connecting body 211, the rear retainer 26 sheathes the plug core 21, and the end, at which the boss 261 is disposed, of the rear retainer 26 is located at a joint between the head 212 and the connecting body 211.

Figure 6:
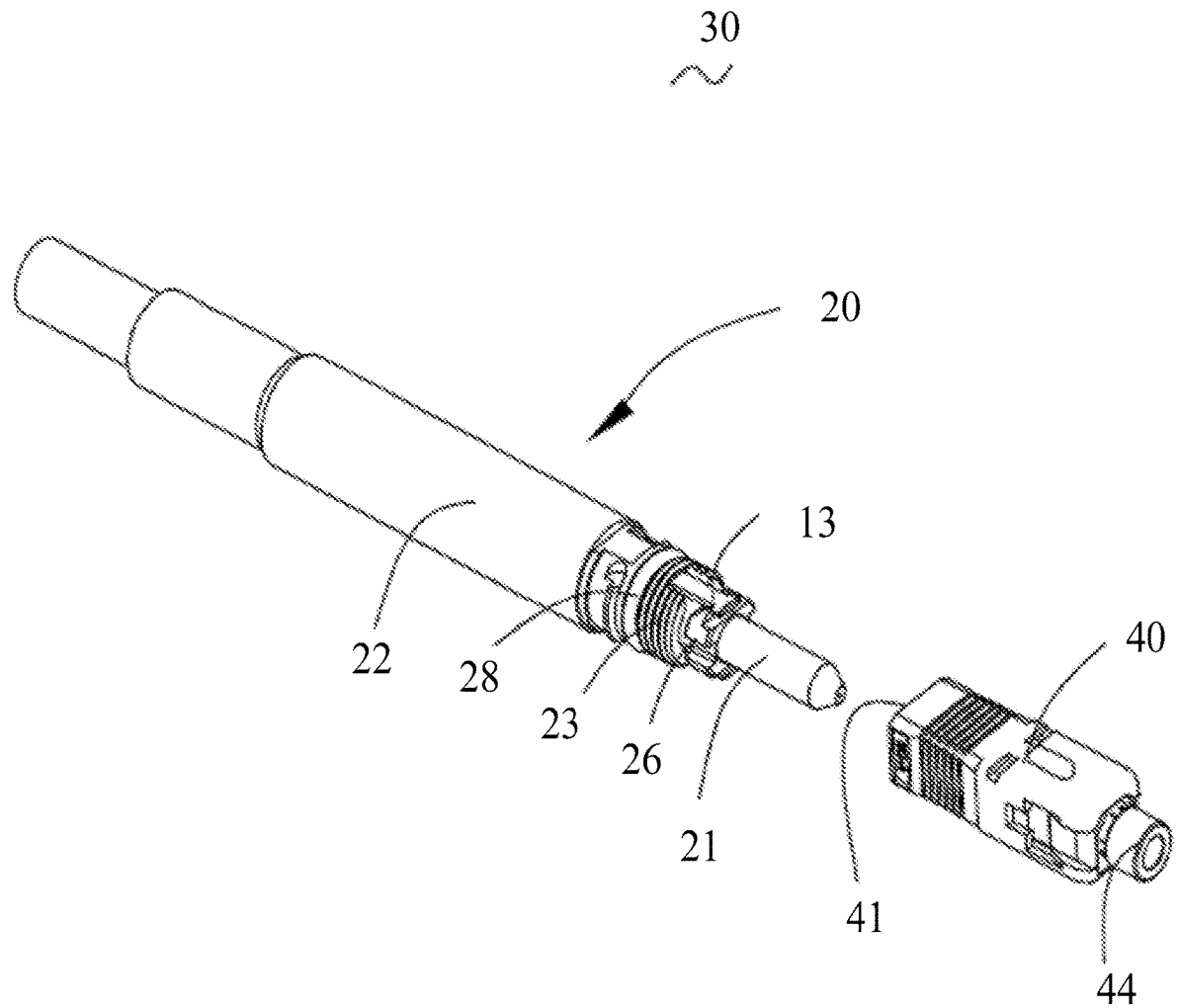
FIG. 6 is a schematic exploded diagram of a fiber plug according to the present disclosure.
Figure 8:
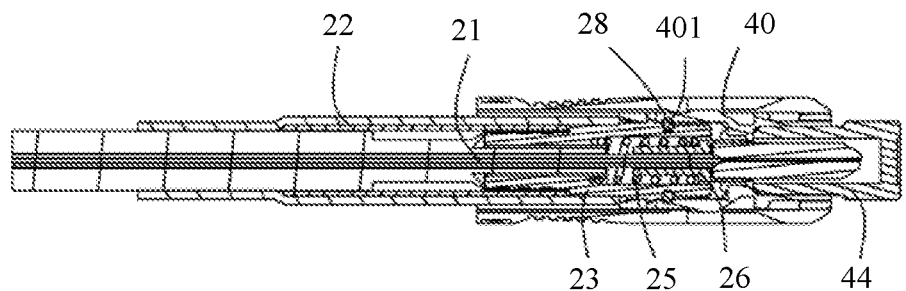
FIG. 8 is a schematic sectional diagram of a fiber plug obtained after the fiber plug shown in FIG. 6 is assembled.

Referring to FIG. 6 and FIG. 8, a fiber plug 30 in the present disclosure includes the connector 20 and a connector housing 40, and an opening part 41 is disposed at one end of the connector housing 40. The end, at which the second jack 233 is disposed, of the limiting sleeve 23 is plugged into the connector housing 40 through the opening part 41. In this embodiment, the second section 2303 of the limiting sleeve 23 is plugged into the connector housing 40. In this embodiment, preferably, inner threads are disposed in the cavity, the inner threads are connected to the fitting part of the connector 20 by using threads, thereby connecting the connector 20 and the connector housing 40 more firmly. The fiber plug 30 in the present disclosure is suitable for outdoor direct routing of fibers and a scenario in which the fibers pass through a pipeline to a home. It is extremely convenient to install the connector housing 40 onto the connector 20 on site after routing of the fibers is completed, to perform connection with a network device.

Figure 7:
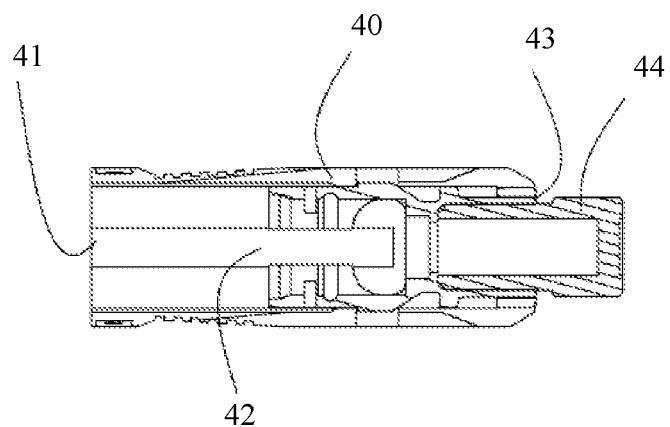
FIG. 7 is a schematic sectional diagram of a connector head shown in FIG. 6.

Referring to FIG. 7, further, a cavity 42 is formed inside the connector housing 40, one end of the connector housing 40 is the opening part 41 and the other end is a through hole 43, both the opening part 41 and the through hole 43 are through to the cavity 42, a groove 401 is disposed on an inner circumferential surface of the cavity 42, and the groove 401 is used to accommodate the sealing ring 28 that sheathes the limiting sleeve 23. In this embodiment, the groove 401 butts the first groove to clamp the sealing ring 28. The sealing ring 28 effectively implements sealing between the connector 20 and the connector housing 40, and prevents the outside from contaminating the connector 20.

In this embodiment, the connector housing 40 is installed on the connector 20 and forms a standard fiber plug together with the connector 20. The plug core 21 protrudes out of the through hole 43. In this embodiment, the fiber plug is an SC-type fiber plug.

Further, a protection part 44 is disposed at the end, at which the through hole 43 is disposed, of the connector housing 40. The protection part 44 is in a shape of a cap made of a rubber material, and can be plugged into the through hole 43 of the connector housing 40.

A network device provided in an embodiment of the present disclosure includes the fiber plug 30 and an adapter with a fiber jack, where a plug core 21 of the fiber plug 30 is connected to the fiber jack of the adapter in a plug-in manner.

What is disclosed above is merely example embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A plug protection cap comprising:
   a main body, wherein an accommodating cavity is disposed in the main body, an inlet that extends through the accommodating cavity is disposed on an end face of one end of the main body;
   a connecting sleeve; and
   a traction stub, wherein one end of the connecting sleeve detachably sheathes one end that is of the main body and that is away from the inlet, and the other end of the connecting sleeve is connected to one end of the traction stub in a rotatable manner.

2. The plug protection cap according to claim 1, comprises:
   a first flange disposed on an outer circumferential surface of the one end of the traction stub; and
   a second flange disposed on an inner circumferential surface of the other opening that is of the connecting sleeve and that is away from a first inner thread, wherein the first flange is clamped onto the second flange, and wherein the first flange is rotatable relative to the second flange.

3. The plug protection cap according to claim 2, wherein the traction stub is a column, wherein one end of the traction stub is away from the first flange is a pointed part, and a groove is disposed inside the end of the traction stub at which the first flange is disposed.

4. The plug protection cap according to claim 1, further comprising a locking part is disposed at a position that is on an inner circumferential surface of the accommodating cavity and that is near the inlet, wherein the locking part is one of an inner thread, a hook, a slot, or an elastic bulge.

5. The plug protection cap according to claim 1, comprising:
   openings disposed at both ends of the connecting sleeve;
   a first inner thread disposed on an inner circumferential surface of one of the openings; and
   a first outer thread connected to the first inner thread disposed on an outer circumferential surface of the end that is of the main body and that is away from the inlet.

6. The plug protection cap according to claim 5, wherein the main body is a hollow column that is open at one end and closed at the other end and has a terraced pattern, and wherein an outer circumference of the end at which the inlet is disposed is greater than an outer circumference of the end at which the first outer thread is disposed.

7. The plug protection cap according to claim 1, wherein a through hole is further disposed on the traction stub.

8. An optical fiber connector assembly, wherein the optical fiber connector assembly comprises a plug protection cap, and a connector, wherein the plug protection cap comprises:
a main body, wherein an accommodating cavity is disposed in the main body, an inlet that extends through the accommodating cavity is disposed on an end face of one end of the main body;
a connecting sleeve; and
a traction stub, wherein one end of the connecting sleeve detachably sheathes one end that is of the main body and that is away from the inlet, and the other end of the connecting sleeve is connected to one end of the traction stub in a rotatable manner; and wherein the connector comprises a plug core, a plug core holder, a limiting sleeve, a spring, a rear retainer, and a sealing ring;
wherein the limiting sleeve comprises an accommodating cavity, a first jack, a second jack opposite to the first jack, and at least one limiting elastic plate, wherein both the first jack and the second jack extend through the accommodating cavity, the at least one limiting elastic plate is disposed at an edge of the second jack and extends in a direction parallel to an axis of the limiting sleeve, and the sealing ring sheathes one end, at which the second jack is disposed, of the limiting sleeve;
wherein one end of the limiting sleeve is connected to the plug core holder in a plug-in manner, the spring and the rear retainer sheathe the plug core, and the plug core passes through the plug core holder and the accommodating cavity and protrudes out of the second jack;

wherein the spring and a portion of the rear retainer are located in the accommodating cavity, and the spring connects the rear retainer and the accommodating cavity; and
wherein the at least one limiting elastic plate is clamped onto the rear retainer.

9. The optical fiber connector assembly according to claim 8, wherein an abut flange is disposed on an inner circumferential surface of the accommodating cavity, wherein a boss is disposed on an outer circumferential surface of one end of the rear retainer, and wherein two end parts of the spring separately abut against the boss and the abut flange.

10. The optical fiber connector assembly according to claim 9, wherein the plug core comprises a connecting body and a head located at one end of the connecting body, wherein the rear retainer sheathes the plug core, and wherein the end of the rear retainer at which the boss is disposed is located at a joint between the head and the connecting body.

11. The optical fiber connector assembly according to claim 9, the at least one limiting elastic plates comprising two limiting elastic plates, wherein a hook is disposed at a free end of one of the two limiting elastic plates, and wherein a clamping bulge or a slot adaptable to the hook is disposed on the boss of the rear retainer.

12. The optical fiber connector assembly according to claim 8, wherein the plug core holder comprises an outer sealing sleeve and an inner crimping ring, wherein the inner crimping ring is disposed by clinging to an inner circumferential surface of the outer sealing sleeve, and wherein an axial length of the inner crimping ring is less than an axial length of the outer sealing sleeve.

\* \* \* \* \*